United States Patent
Matoba et al.

(10) Patent No.: US 7,684,672 B2
(45) Date of Patent: Mar. 23, 2010

(54) BROADCAST STORAGE SYSTEM WITH REDUCED USER'S CONTROL ACTIONS

(75) Inventors: Hiroshi Matoba, Tokyo (JP); Takuya Nishibayashi, Tokyo (JP); Satoshi Onodera, Tokyo (JP); Akihisa Kenmochi, Tokyo (JP); Hidetaka Hane, Tokyo (JP); Jun-Ichi Yamato, Tokyo (JP)

(73) Assignee: NEC Corporation, Tokyo (JP)

( * ) Notice: Subject to any disclaimer, the term of this patent is extended or adjusted under 35 U.S.C. 154(b) by 2501 days.

(21) Appl. No.: 10/047,047

(22) Filed: Jan. 15, 2002

(65) Prior Publication Data
US 2002/0097986 A1 Jul. 25, 2002

(30) Foreign Application Priority Data
Jan. 23, 2001 (JP) ............................. 2001-014680

(51) Int. Cl.
*H04N 5/91* (2006.01)
*H04N 5/00* (2006.01)

(52) U.S. Cl. .............................. 386/83; 386/46; 386/92; 386/125

(58) Field of Classification Search ....................... None
See application file for complete search history.

(56) References Cited

U.S. PATENT DOCUMENTS 7,072,576 B2 * 7/2006 Tanaka ........................ 386/125
7,159,232 B1 * 1/2007 Blackketter et al. ........... 725/38
2002/0057893 A1 * 5/2002 Wood et al. .................... 386/46

FOREIGN PATENT DOCUMENTS

| JP | 11-317937 | 11/1999 |
|---|---|---|
| JP | 2000-285598 | 10/2000 |
| JP | 2000-349833 | 12/2000 |
| JP | 2001-8150 | 1/2001 |
| JP | 2001-28729 | 1/2001 |

* cited by examiner

*Primary Examiner*—Huy T Nugyen
*Assistant Examiner*—Heather R Jones
(74) *Attorney, Agent, or Firm*—Scully, Scott, Murphy & Presser, P.C.

(57) ABSTRACT

A broadcast storage system is disclosed which is easily controllable by the user for setting programs for timer recording and playing back recorded programs. The broadcast storage system has one or more slave apparatus and a master apparatus. The master apparatus grasps programs set for timer recording by each of the slave apparatus. When a program to be recorded is determined by the user or an automatic timer recording process, the master apparatus selects an apparatus to record the program such that a plurality of timer recording settings are not made at one time in one apparatus, and instructs the selected apparatus to set the program for timer recording. When instructed to set the program for timer recording, a slave apparatus sets the program for timer recording, and records the program at the time when the program is broadcast.

37 Claims, 10 Drawing Sheets

Fig. 5

| | channel A | channel B | channel C | channel D |
|---|---|---|---|---|
| 7:00 | ×××  | ××× | ××× | ××× |
|  | ××× |  |  | ××× |
| 8:00 | ××× |  | ××× | ××× |
|  |  | ××× |  |  |
| 9:00 | ××× | ××× |  | ××× |
|  |  |  | ××× |  |
| 10:00 | ××× | ××× |  | ××× |

Fig. 6

| | apparatus a | apparatus b |
|---|---|---|
| 7:00 | channel A ××× | channel C ××× |
| 8:00 | | |
|  | channel B ××× | |
| 9:00 | | channel D ××× |
| 10:00 | | |

BROADCAST STORAGE SYSTEM WITH REDUCED USER'S CONTROL ACTIONS

BACKGROUND OF THE INVENTION

1. Field of the Invention

The present invention relates to a broadcast storage system for recording and storing programs that are broadcast in one or more channels.

2. Description of the Related Art

As the transmission of digital broadcasts is full-fledged due to the widespread usage of CS broadcasting systems and CATV systems, a large number of television channels that can be received are available at user's terminals. The availability of many television channels often makes users unable to view a preferred program on a real-time basis when a plurality of desired programs are simultaneously broadcast or the user is not available in front of the television set at the time of the program. Therefore, more opportunities come up for timer recording of desired broadcasts.

There is also an increased possibility for the simultaneous recording of a plurality of programs in the presence of more and more television channels. For recording a plurality of programs that are broadcast simultaneously, it has been customary for the user to have a plurality of VTRs set for timer recording of the respective programs.

Conventional VTRs are disadvantageous in that they cannot easily be randomly accessed and video cassettes for use therein have a small recording capacity. To avoid such drawbacks, there has become available a broadcast storage apparatus for recording programs in a hard disk having a large recording capacity. The recording capacity of such a hard disk is increased or a disk array device having a plurality of hard disks is used to allow a broadcast storage apparatus with a hard disk to be able to record programs for a longer period of time than a VTR which records programs on a single video cassette. One broadcast storage apparatus of the above type can be operated for setting timer recording and other modes from a personal computer which is connected to the broadcast storage apparatus. Another broadcast storage apparatus can be remotely controlled for timer recording by the user who is watching information displayed on the television display screen.

Digital broadcasts transmitted via communications satellites are accompanied by an EPG (Electronic Program Guide) which represents program information including the titles of programs to be broadcast and the dates and times of those programs. Using a receiver with an EPG receiving function, the user is capable of referring to a program list on the television display and selecting a program to be recorded from the program list. It is also possible to realize a broadcast storage apparatus for extracting programs to be recorded based on an EPG and automatically recording the extracted programs.

EPGs may be distributed to users via telephone lines and ISDN lines rather than broadcasts. EPGs thus distributed may also be used for the users to select programs to be recorded.

According to a process of simultaneously recording a plurality of programs on a plurality of broadcast storage apparatus, the user needs to assign programs to those broadcast storage apparatus for timer recording in view of the present timer recording statuses and available recording tape lengths in the broadcast storage apparatus. Such a process has been tedious and time-consuming.

If programs on a plurality of channels are recorded on a plurality of broadcast storage apparatus, then the user plays back a desired one of the recorded programs on the broadcast storage apparatus which has recorded the desired program. Therefore, the user is required to recognize, in advance, which broadcast storage apparatus or video cassette tape has recorded the desired program.

An increased number of broadcast storage apparatus that are available to the user makes it possible for the user to record an increased number of programs simultaneously. With more broadcast storage apparatus used, however, the amount of information that needs to be grasped by the user is also increased, placing a large burden on the user for managing recorded programs and selecting programs to be played back.

While broadcast storage apparatus using hard disks provide a large recording capacity, the recording capacity is nevertheless limited, and the hard disks cannot be removed from the broadcast storage apparatus. Consequently, even if the user wants to keep recorded programs in archival storage, the user is unable to store such recorded programs in excess of a certain amount of data.

SUMMARY OF THE INVENTION

It is therefore an object of the present invention to provide a broadcast storage system which reduces the burden on the user for timer recording and playback of broadcast programs.

Another object of the present invention is to provide a broadcast storage system which is capable of storing recorded programs in excess of a recording capacity.

According to an aspect of the present invention, a broadcast storage system has one or more slave apparatus and a master apparatus.

Each of the slave apparatus sets a program for timer recording when the slave apparatus is instructed to set the program for timer recording, and records the program at a time when the program set for timer recording is broadcast. The master apparatus selects a slave apparatus to record a program such that a plurality of timer recording settings are not made at one time in one apparatus, when the program to be recorded is determined, and instructs the selected slave apparatus to set the program for timer recording.

Since the system is arranged such that the master apparatus manages timer recording settings in all the slave apparatus, control actions that the user makes to set programs for timer recording are reduced.

According to an embodiment of the present invention, if a slave apparatus to record a program cannot be selected, the master apparatus rearranges timer recording settings made in the slave apparatus to retain a slave apparatus to record a program, instructs the retained slave apparatus to change timer recording settings and set the program for timer recording, and instructs other slave apparatus in which timer recording settings are changed to change timer recording settings. If instructed to change timer recording settings by the master apparatus, each of the slave apparatus changes timer recording settings.

Therefore, when a slave apparatus to record a program cannot be selected, since the master apparatus rearranges timer recording settings made in the slave apparatus to retain a slave apparatus to record a program, it is possible to record as many programs as possible.

According to an embodiment of the present invention, if instructed to start recording a program without setting timer recording therefor, the master apparatus instructs a slave apparatus which has not recorded programs so far and whose period of time up to the recording start time of a first program set for timer recording is the longest, to start recording the program. If instructed to start recording a program, each of the slave apparatus immediately starts to record the program.

Thus, even if a program is to be recorded without setting timer recording therefor, it is possible to assign an optimum apparatus to recording the program.

According to an embodiment of the present invention, if instructed to start recording a program without setting timer recording therefor, the master apparatus rearranges timer recording settings made in the slave apparatus, increases, as much as possible, a period of time up to the recording start time of a first program set for timer recording in either one of the slave apparatus, instructs the slave apparatus in which timer recording settings are changed to change timer recording settings, and instructs the slave apparatus whose period of time up to the recording start time has been increased as much as possible to start recording the program. If instructed to change timer recording settings by the master apparatus, each of the slave apparatus changes timer recording settings, and, if instructed to start recording a program, each of the slave apparatus immediately starts to record the program.

Therefore, if a program is to be recorded without setting timer recording therefor, it is possible to assign an optimum apparatus to recording the program after timer recording settings are optimized.

According to an embodiment of the present invention, if instructed to start recording a program without setting timer recording therefor, the master apparatus selects a slave apparatus which has not recorded programs so far and which has not made timer recording settings until the end time of a program instructed to start being recorded, and instructs the selected slave apparatus to start recording the program. If instructed to start recording a program, each of the slave apparatus immediately starts to record the program.

Consequently, if a program is to be recorded without setting timer recording therefor and the end time of the program is known, it is possible to assign an optimum apparatus to recording the program.

According to an embodiment of the present invention, the master apparatus and each of the slave apparatus are connected to each other by a communication line, each of the slave apparatus indicates a program set for timer recording by the slave apparatus to the master apparatus via the communication line, and the master apparatus instructs the slave apparatus to set the program for timer recording via the communication line.

According to another aspect of the present invention, a broadcast storage system has one or more slave apparatus and a master apparatus.

The slave apparatus determine whether the slave apparatus are capable of recording a program or not in response to an inquiry as to whether the slave apparatus are capable of recording the program. If the slave apparatus are capable of recording the program, the slave apparatus send a corresponding response, set the program for timer recording, and record the program when a time to broadcast the program is reached. If a program to be recorded is determined, the master apparatus successively asks the slave apparatus about whether the slave apparatus are capable of recording the program until the response indicating that the slave apparatus are capable of recording the program is received. If the response is received from a slave apparatus, the master apparatus instructs the slave apparatus which has sent the response to set the program for timer recording.

According to an embodiment of the present invention, if the response indicating that the slave apparatus are capable of recording the program is not received from any of the slave apparatus, the master apparatus switches around and rearranges timer recording settings made in the master and slave apparatus to retain a slave apparatus to record the program.

According to an embodiment of the present invention, the master apparatus is connected to an output device for displaying programs, and when the master apparatus has received a playback signal produced by playing back the program via the communication line, the master apparatus outputs the playback signal to the output device. The slave apparatus plays back the program, and transmits a program signal via the communication line to the master apparatus.

According to an embodiment of the present invention, the master apparatus displays, on the output device, a list of programs stored in the slave apparatus in association with the slave apparatus and times at which the programs have been recorded, for the user to select a program to be played back from the list.

The master apparatus is thus capable of providing a unified user interface to the user, which is independent of the slave apparatus.

Since recorded programs are displayed as a shortened list associated with the slave apparatus on a display screen, the recorded programs are displayed in a form which is easy for the user to see.

According to an embodiment of the present invention, the master apparatus also has a function to record and play back the program.

According to an embodiment of the present invention, the master apparatus comprises a computer.

According to still another aspect of the present invention, a broadcast storage system has a master apparatus and one or more slave apparatus.

The master apparatus comprises a first tuner for extracting a signal in an indicated channel from a received broadcast signal, a first encoder for encoding the signal in the channel to generate program data, a first memory for storing the program data, a selector for selecting one of the program data read from the first memory and program data input from another device, a decoder for decoding the program data input from the selector, and a controller for grasping programs set for timer recording in each of all the apparatus, and, if a program to be recorded is determined, selecting an apparatus to record the program such that a plurality of timer recording settings are not made at one time in one apparatus, and, if the master apparatus is selected, extracting a channel on which the program is broadcast with the first tuner when a time to broadcast the program is reached, generating program data of the program with the first encoder, and storing the program data in the first memory, and, if a slave apparatus other than the master apparatus is selected, instructing the selected slave apparatus to set the program for timer recording, and, if the program data of a program instructed by the user to be played back is stored in the first memory of the master apparatus, reading the program data from the first memory, and decoding the program data with the first decoder, and, if the program data of a program instructed by the user to be played back is stored in a slave apparatus other than the master apparatus, instructing the slave apparatus to play back the program, and decoding the program data input from the slave apparatus with the first decoder.

Each of the slave apparatus comprises a second tuner for extracting a signal on an indicated channel from a received broadcast signal, a second encoder for encoding the signal on the channel to generate program data, a second memory for storing the program data, and a controller for extracting a channel on which a program set for timer recording is broadcast with the second tuner when a time to broadcast the program is reached, generating program data of the program with the second encoder, storing the program data in the second memory, reading the program data of a program instructed by the master apparatus to be played back from the second memory, and transmitting the read program data to the master apparatus.

According to yet another aspect of the present invention, a broadcast recording apparatus in a broadcast storage comprises a tuner for extracting a signal on an indicated channel from a received broadcast signal, an encoder for encoding the signal on the channel to generate program data, a memory for storing the program data, a decoder for decoding the program data input from the selector, and a controller for grasping programs set for timer recording in a plurality of apparatus including the apparatus itself, and, if a program to be recorded is determined, selecting an apparatus to record the program such that a plurality of timer recording settings are not made at one time in one apparatus, and, if the apparatus itself is selected, controlling the tuner to extract a channel on which the program is broadcast when a time to broadcast the program is reached, control the encoder to generate program data of the program, and controlling the memory to store the program data, and, if an apparatus other than the apparatus itself is selected, instructing the selected apparatus to set the program for timer recording, and, if the program data of a program instructed by the user to be played back is stored in the memory of the apparatus itself, reading the program data from the memory, and controlling the decoder to decode the program data, and, if the program data of a program instructed by the user to be played back is stored in an apparatus other than the apparatus itself, instructing the other apparatus to play back the program, and controlling the decoder to decode the program data input from the other apparatus.

According to still yet another aspect of the present invention, a broadcast storage apparatus comprises a temporary memory for temporarily storing up to a predetermined amount of program data, a permanent memory for storing program data selected by the user as program data to be permanently stored from among the program data stored in the temporary memory, a recording controller for successively storing the program data of programs set for timer recording in the temporary memory, and partly deleting the program data recorded in the temporary memory in the past if the program data stored in the temporary memory exceeds the predetermined amount, a saving controller for transferring the program data selected by the user as program data to be permanently stored from among the program data stored in the temporary memory to the permanent memory, and a playback controller for playing back a program selected by the user from the programs whose program data have been stored in the temporary memory and/or the permanent memory.

Therefore, the user can actually view all or some of the programs automatically stored in the temporary memory at a desired time, and select programs to be saved.

According to an embodiment of the present invention, the recording controller displays a period of time for which the program data stored in the temporary memory are held, on an output device for displaying programs.

The user is thus capable of recognizing the time up to which a program is saved.

According to an embodiment of the present invention, a broadcast storage apparatus further has means for allowing the user to set memory capacities to the temporary memory and the permanent memory.

According to another aspect of the present invention, a broadcast storage system comprises one or more slave apparatus for automatically continuously recording a program on a predetermined channel and playing back the recorded program as instructed, and a master apparatus for, when the user is to determine a channel on which each of the slave apparatus automatically continuously records a program and to select a program to be played back on the channel, displaying a list of programs recorded by all the slave apparatus in association with channels and times at which the programs are recorded, on an output device for displaying programs, and, if a program to be displayed is selected by the user with a channel and a time, controlling the slave apparatus which has recorded the program to play back the program, and, if the user changes the channel to another channel, controls the slave apparatus which has recorded a program on the other channel at the same time as the former channel to play back the program on the other channel.

Therefore, the user can view programs in the past in the same manner as if viewing them on a real-time basis, and can also set forward and back the viewing time.

According to still another aspect of the present invention, a broadcast storage system has a master apparatus and one or more slave apparatus.

The master apparatus comprises a first memory for storing the program data of recorded programs, a first decoder for decoding program data read from the first memory, and a controller for grasping programs recorded by each of all the apparatus, and, if the program data of a program instructed by the user to be played back is stored in the first memory of the master apparatus, reading the program data from the first memory, decoding the program data into a program signal with the first decoder, outputting the program signal to an output device for displaying programs, and, if the program data of a program instructed by the user to be played back is stored in a slave apparatus other than the master apparatus itself, instructing the other slave apparatus to play back the program, outputting a program signal received from the other slave apparatus to the output device, and, if the program data of a program which is highly likely to be played back by a subsequent control action of the user is stored in the first memory of the master apparatus, preparing the master apparatus to read the program data from the first memory and decode the program data with the first decoder, and, if the program data of a program which is highly likely to be played back by a subsequent control action of the user is stored in a slave apparatus other than the master apparatus itself, instructing the other slave apparatus to prepare the other slave apparatus to play back the program.

Each of the slave apparatus comprises a second memory for storing the program data, a second decoder for decoding the program data read from the second memory into a program signal, and a controller for reading the program data of a program instructed by the master apparatus to be played back from the second memory, decoding the program data into a program signal with the second decoder, transmitting the program signal to the master apparatus, reading the program data of the program instructed to be prepared for playback from the second memory, and preparing the second decoder to decode the program data.

With the above arrangement, inasmuch as a program which is highly likely to be instructed by the user to be played back is prepared in advance to be played back, the time required to switch between programs to be played back is shortened.

According to yet another aspect of the present invention, a broadcast recording apparatus in a broadcast storage comprises a memory for storing the program data of recorded programs, a decoder for decoding program data read from the memory, and a controller for grasping programs recorded by each of all apparatus of the system, and, if the program data of a program instructed by the user to be played back is stored in the memory of the apparatus itself, reading the program data from the memory, decoding the program data into a program signal with the decoder, outputting the program signal to an output device for displaying programs, and, if the program data of a program instructed by the user to be played back is stored in an apparatus other than the apparatus itself, instructing the other apparatus to play back the program, outputting a program signal received from the other apparatus to the output device, and, if the program data of a program which is highly likely to be played back by a subsequent control action of the user is stored in the memory of the apparatus itself, preparing the apparatus itself to read the program data from the memory and decode the program data with the decoder, and, if the program data of a program which is highly likely to be played back by a subsequent control action of the user is stored in an apparatus other than the apparatus itself, instructing the other apparatus to prepare the other apparatus to play back the program.

According to still yet another aspect of the present invention, a broadcast recording apparatus comprises a memory for storing program data of a recorded program, a decoder for decoding program data read from the memory into a program signal, and a controller for reading program data of a program instructed to be played back from the memory, controlling the decoder to decode the read program data into a program signal and transmit the program signal, reading the program data of the program instructed to be prepared for playback from the memory, and preparing the second decoder to decode the program data.

According to a further aspect of the present invention, an apparatus for controlling a broadcast storage apparatus has means for selecting one of a plurality of broadcast recording apparatus to record a program such that a plurality of timer recording settings are not made at one time in one apparatus, and means for instructing the selected apparatus to set the program for timer recording.

The above and other objects, features, and advantages of the present invention will become apparent from the following description with reference to the accompanying drawings which illustrate examples of the present invention.

BRIEF DESCRIPTION OF THE DRAWINGS

FIG. 5 is a view showing, by way of example, an EPG displayed on a television display screen for setting programs for timer recording;

FIG. 6 is a view showing, by way of example, a shortened EPG displayed on a television display screen for playing back recorded programs;

DESCRIPTION OF THE PREFERRED EMBODIMENTS

1st Embodiment

Figure 1:
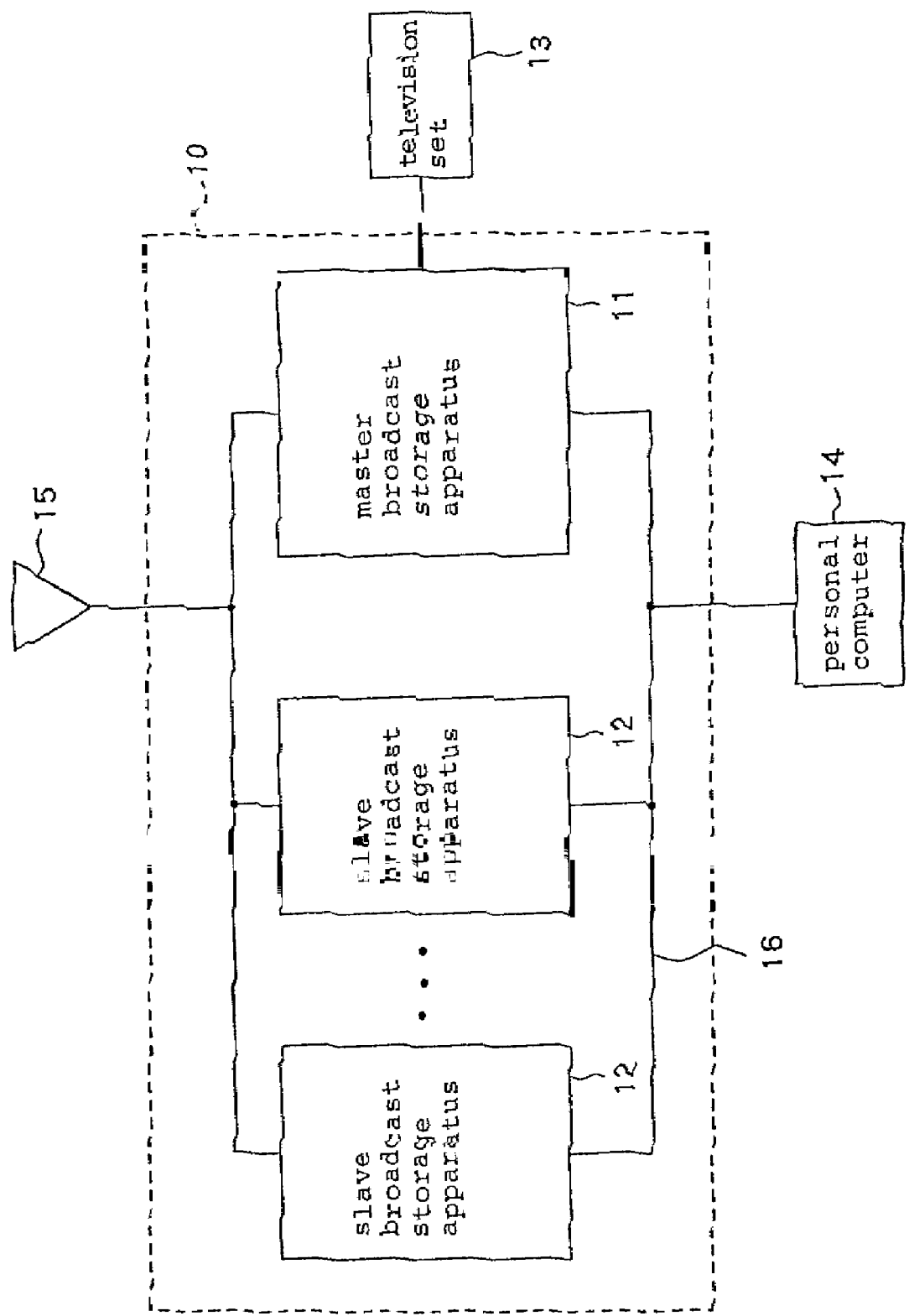
FIG. 1 is a block diagram of a broadcast storage system according to a first embodiment of the present invention.

Referring now to FIG. 1, a broadcast storage system according to a first embodiment of the present invention comprises master broadcast storage apparatus 11 and a plurality of slave broadcast storage apparatus 12. Master broadcast storage apparatus 11 and slave broadcast storage apparatus 12 are connected to antenna 15 and also to each other by communication lines 16 to which personal computer 14 is connected. Master broadcast storage apparatus 11 is connected to television set 13.

Figure 2:
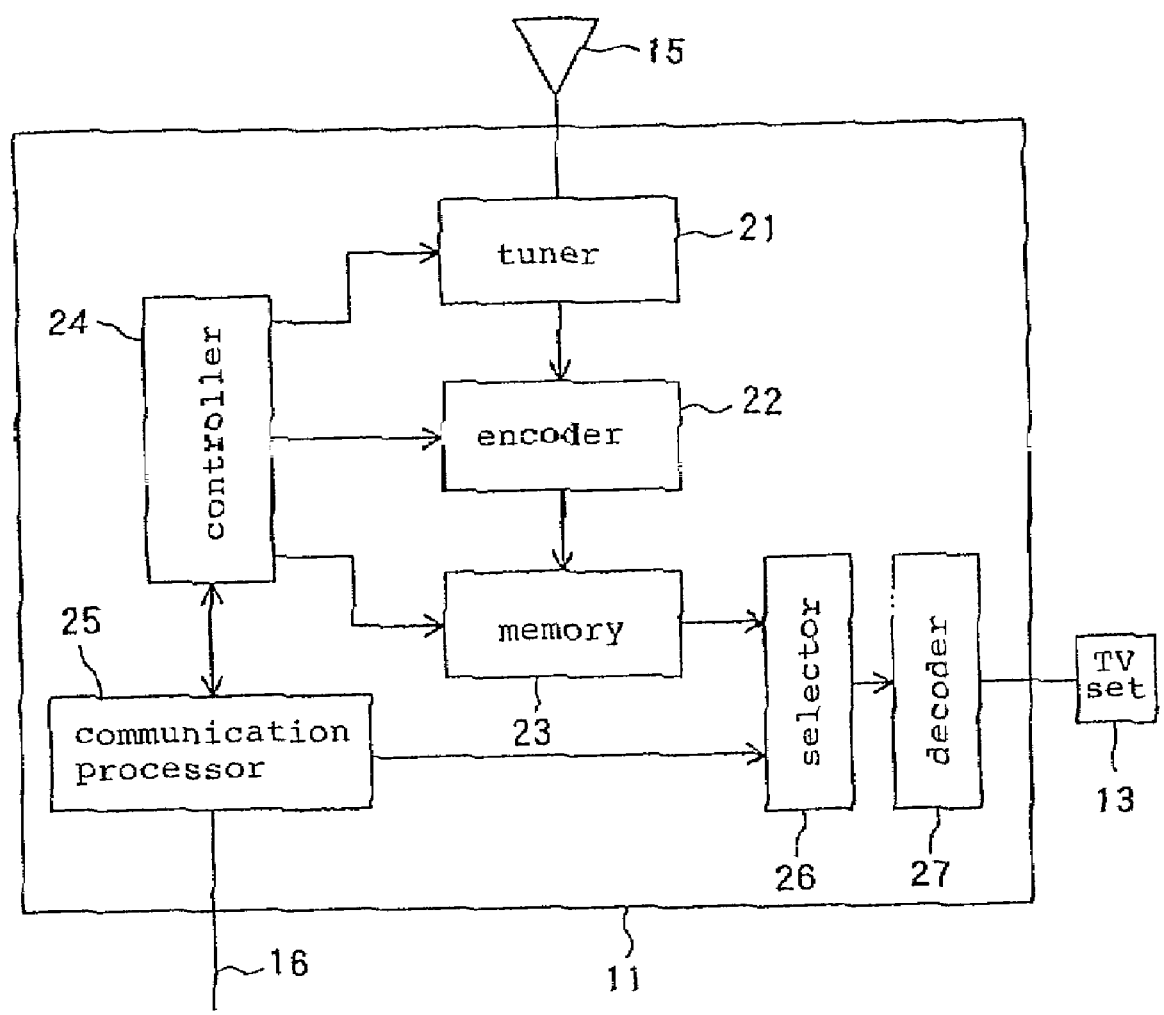
FIG. 2 is a block diagram of a master broadcast storage apparatus in the broadcast storage system shown in FIG. 1.

As shown in FIG. 2, master broadcast storage apparatus 11 comprises tuner 21, encoder 22, memory 23, controller 24, communication processor 25, selector 26, and decoder 27.

Tuner 21 extracts a signal on a desired channel from a signal from antenna 15. Encoder 22 encodes video and audio signals on the channel extracted by tuner 21, and output the encoded video and audio signals as video and audio data. Encoder 22 encodes video and audio signals according to MPEG2, for example. Memory 23 stores the video and audio data from encoder 22. Communication processor 25 transmits and receives control information and also receives video and audio data via communication line 16. Controller 24 generates and analyzes the control information which is transmitted and received by communication processor 25 via communication line 16, and also controls operation of various components including tuner 21, encoder 22, and memory 23. Selector 26 selects either the video and audio data stored in memory 23 or the video and audio data received by communication processor 25. Decoder 27 decodes the video and audio data input from selector 26, and inputs the decoded video and audio data to television set 13, which serves as an output device for outputting video and audio signals of programs.

Figure 3:
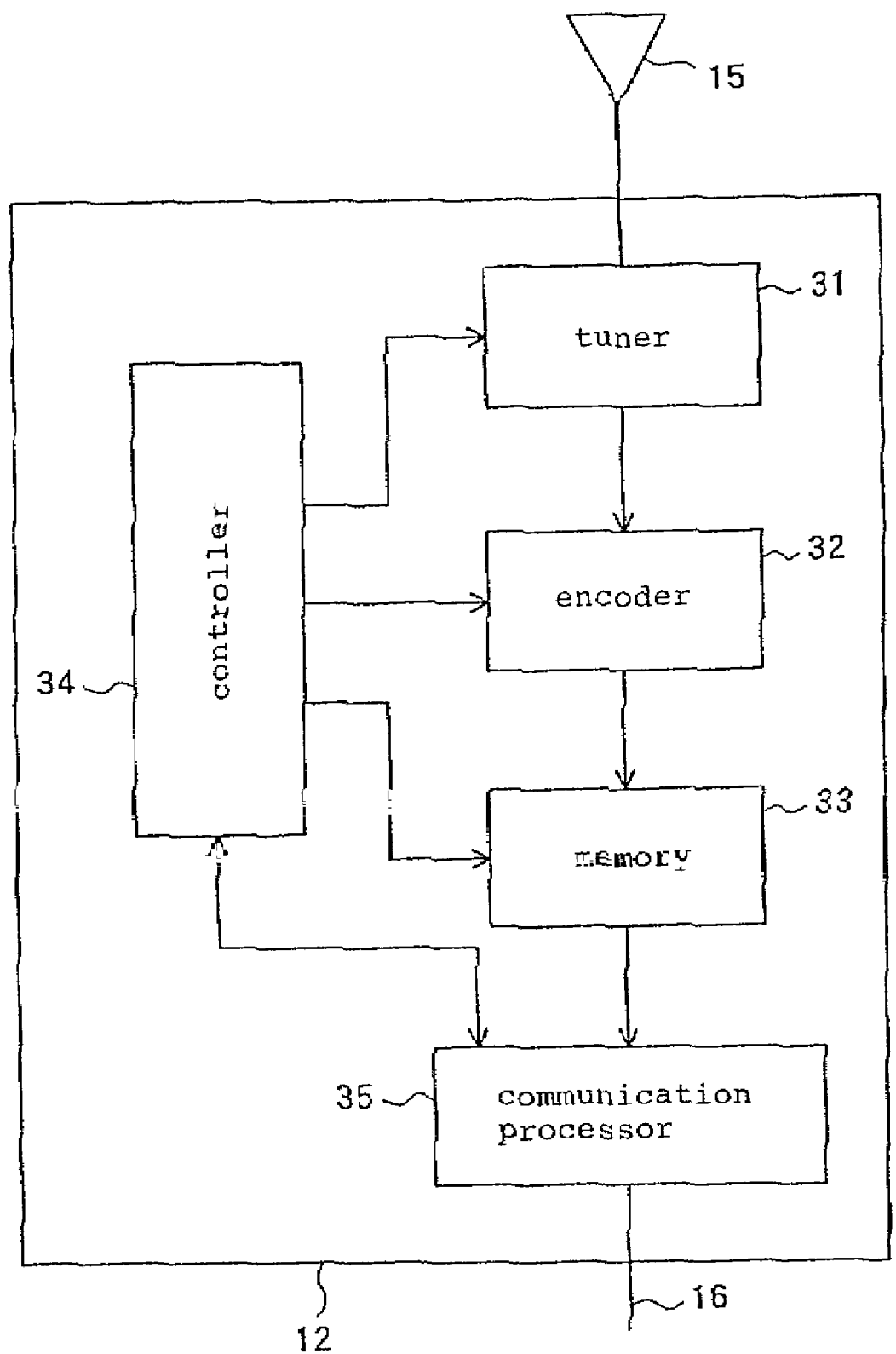
FIG. 3 is a block diagram of a slave broadcast storage apparatus in the broadcast storage system shown in FIG. 1.

As shown in FIG. 3, slave broadcast storage apparatus 12 comprises tuner 31, encoder 32, memory 33, controller 34, and communication processor 35.

Tuner 31 extracts a signal on a desired channel from a broadcast signal from antenna 15. Encoder 32 encodes video and audio signals in the channel extracted by tuner 31, and output the encoded video and audio signals as video and audio data. Encoder 32 encodes video and audio signals according to MPG, for example. Memory 33 stores the video and audio data from encoder 32. Communication processor 35 transmits and receives control information and also receives video and audio data via communication line 16. Controller 34 generates and analyzes the control information which is transmitted and received by communication processor 35 via communication line 16, and also controls operation of various components including tuner 31, encoder 32, and memory 33.

In the present embodiment, master broadcast storage apparatus 11 and slave broadcast storage apparatus 12 are structurally different from each other. However, they may be of an identical structure so that they can be used interchangeably.

Figure 4:
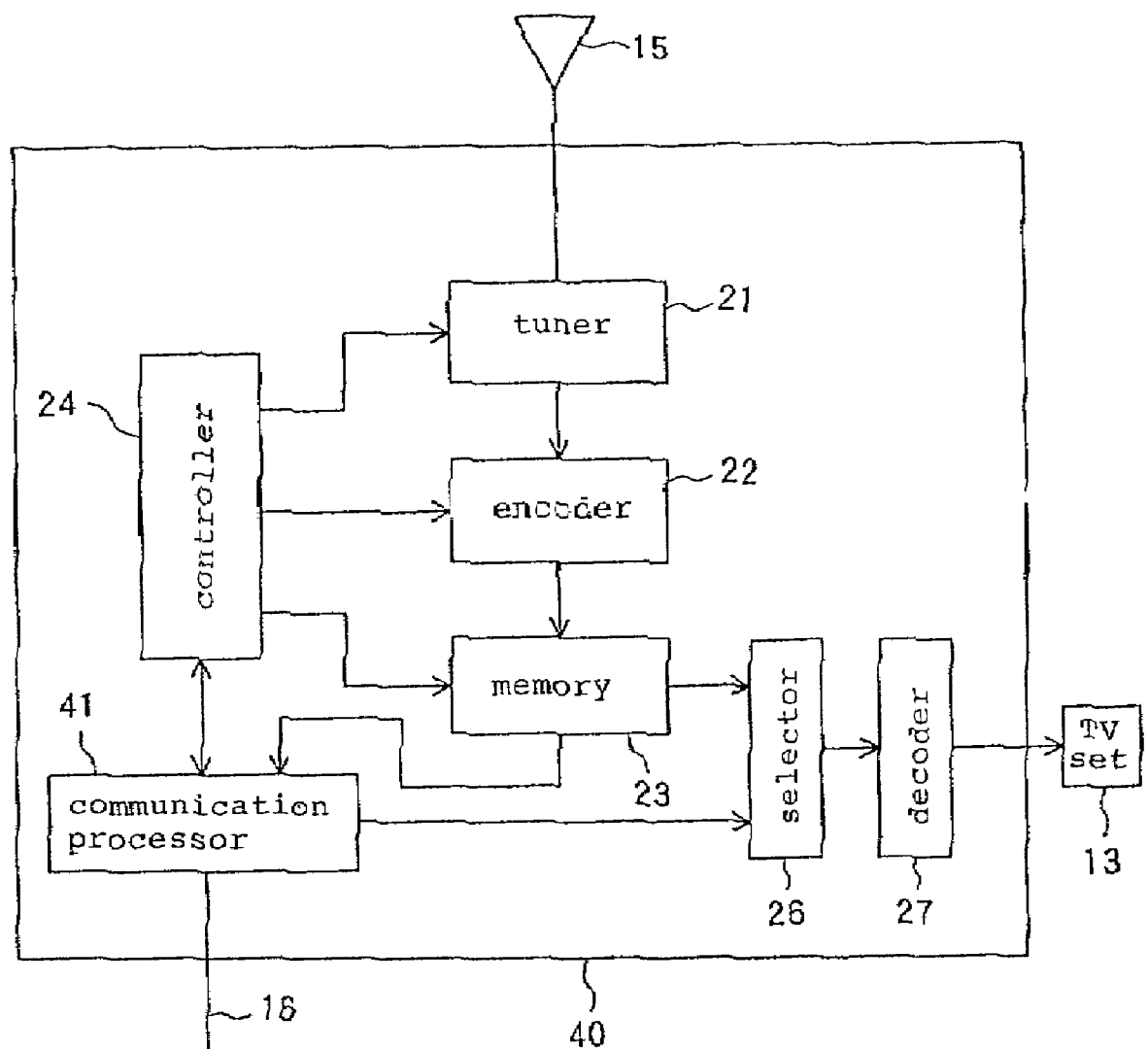
FIG. 4 is a block diagram of a broadcast storage apparatus.

As shown in FIG. 4, interchangeable broadcast storage apparatus 40 comprises tuner 21, encoder 22, memory 23, controller 24, communication processor 41, selector 26, and decoder 27.

Tuner 21, encoder 22, memory 23, controller 24, selector 26, and decoder 27 are identical to those shown in FIG. 2.

Communication processor 41 transmits and receives control information and also receives video and audio data via communication line 16, and also transmits video and audio data stored in memory 23 via communication line 16.

If interchangeable broadcast storage apparatus 40 is used as a master broadcast storage apparatus, then it is connected to television set 13, and selector 26 and decoder 27 are enabled. If interchangeable broadcast storage apparatus 40 is used as a slave broadcast storage apparatus, then selector 26 and decoder 27 are disabled.

An initial setting is made to use broadcast storage apparatus 40 as either a master broadcast storage apparatus or a slave broadcast storage apparatus. Such a setting may be indicated from personal computer 14 which is connected to broadcast storage apparatus 40. Alternatively, a broadcast storage apparatus that is detected as being connected to television set 13 may be recognized as a master broadcast storage apparatus.

Operation of broadcast storage system 10 will be described below.

When master broadcast storage apparatus 11 and slave broadcast storage apparatus 12 are connected to each other or turned on, they transmit and receive control information to inform each other of their existence. At this time, the number of interconnected slave broadcast storage apparatus is grasped. Then, slave broadcast storage apparatus 12 indicate recorded program information representing programs stored thereby, timer recording information representing programs set for timer recording thereby, and the capacity of an available storage area capable of storing video and audio data of video and audio signals of programs, to master broadcast storage apparatus 11. Then, master broadcast storage apparatus 11 displays, on the display screen of television set 13, the recorded program information and timer recording information of entire broadcast storage system 10.

For playing back a program recorded in either one of the broadcast storage apparatus, the user specifies the program to be played back by seeing the recorded program information displayed on the display screen of television set 13. Master broadcast storage apparatus 11 determines which one of the broadcast storage apparatus has been storing the specified program. If the program has been stored in master broadcast storage apparatus 11, then master broadcast storage apparatus 11 reads the video and audio data of the program from the memory 23, and decoder 27 decodes the video and audio data and inputs the decoded video and audio data to television set 13. If the program has been stored in either one of slave broadcast storage apparatus 12, then master broadcast storage apparatus 11 instructs that one of slave broadcast storage apparatus 12 play back the program.

When slave broadcast storage apparatus 12 is instructed to play back the program, slave broadcast storage apparatus 12 reads the video and audio data of the program from the memory 33 and transmits the video and audio data to master broadcast storage apparatus 11. In master broadcast storage apparatus 11, decoder 27 decodes the received video and audio data and outputs the decoded video and audio data to television set 13.

For setting timer recording for a program, master broadcast storage apparatus 11 displays on television set 13 an EPG (Electronic Program Guide) containing a list of information of programs to be broadcast on channels. The user sees the EPG and indicates a program to be set for timer recording to master broadcast storage apparatus 11.

Master broadcast storage apparatus 11 selects one of the apparatus in broadcast storage system 10 for recording the program indicated by the user. Master broadcast storage apparatus 11 selects one of the apparatus in view of whether or not the apparatus has already set timer recording for another program that is to be broadcast at the same time as the indicated program and also whether or not the apparatus has a sufficient storage area available for storing the video and audio data of the indicated program.

If master broadcast storage apparatus 11 selects itself, master broadcast storage apparatus 11 sets timer recording for the program. If master broadcast storage apparatus 11 selects either one of slave broadcast storage apparatus 12, then master broadcast storage apparatus 11 instructs selected slave broadcast storage apparatus 12 to set timer recording for the program. If either one of master broadcast storage apparatus 11 and slave broadcast storage apparatus 12 is unable to record the program, then master broadcast storage apparatus 11 reevaluates timer recording settings for the broadcast storage apparatus to determine whether it is possible to obtain a storage area available for recording the program. If a new program can be recorded by reevaluating and optimizing timer recording settings for the broadcast storage apparatus, then master broadcast storage apparatus 11 instructs the broadcast storage apparatus to change their timer recording settings, and sets one of the broadcast storage apparatus for timer recording of the new program.

According to the present embodiment, therefore, it is possible to select a number of slave broadcast storage apparatus 12 to construct optimum broadcast storage system 10 and also to change system configurations, depending on the user's demand for the number of programs that can be stored and also the number of programs that can be recorded.

According to the present embodiment, furthermore, it is possible to provide the user with a unified user interface independent of system configurations. When system configurations are changed, the user can use broadcast storage system 10 in the same manner as with the conventional control process.

Furthermore, timer recording settings for the broadcast storage apparatus can be optimized to use their storage areas efficiently for recording as many programs as possible.

In the present embodiment, it is assumed that slave broadcast storage apparatus 12 are independent of master broadcast storage apparatus 11. However, slave broadcast storage apparatus 12 may be constructed as a desired number of add-on modules that can be incorporated in master broadcast storage apparatus 11. Alternatively, slave broadcast storage apparatus 12 may be arranged as a desired number of software modules that can be executed by master broadcast storage apparatus 11.

In the present embodiment, broadcast storage system 10 is arranged to set timer recording for a program. However, the present invention is also applicable to a process of starting to record a program while the program is being broadcast, without setting timer recording therefor. According to such a process, master broadcast storage apparatus 11 selects, within broadcast storage system 10, slave broadcast storage apparatus 12 to record a program which the user has manually indicated to start recording. Master broadcast storage apparatus 11 instructs selected slave broadcast storage apparatus 12 to start recording the program. Slave broadcast storage apparatus 12 which is instructed immediately starts recording the program. In order to minimize the possibility that a time to start recording another program set for timer recording will be reached while the program is being recorded, the recording of the program is assigned to slave broadcast storage apparatus 12 whose period of time until a first program set for timer recording starts being recorded is the longest. Since the period of time for which the recording of the program is to continue is not clear at the time to start recording the program, it is preferable to assign the recording of the program to slave broadcast storage apparatus 12 whose available storage capacity is as large as possible.

According to another process of starting to record a program while the program is being broadcast, without setting timer recording therefor, master broadcast storage apparatus 11 rearranges timer recording settings in all slave broadcast storage apparatus 12 such that the period of time up to the time to start recording a program which has been set for timer recording in either one of slave broadcast storage apparatus 12 is as long as possible. Then, master broadcast storage apparatus 11 instructs, if necessary, each slave broadcast storage apparatus 12 to change timer recording settings. When instructed to change timer recording settings, slave broadcast storage apparatus 12 changes timer recording settings. Master broadcast storage apparatus 11 instructs slave broadcast storage apparatus 12 whose period of time up to the time to start recording a program is made longest, to start recording the program. The instructed slave broadcast storage apparatus 12 immediately starts recording the program. In the present embodiment, immediately after it has been instructed to start recording a program being broadcast, either one of slave broadcast storage apparatus 12 may start recording the program, and then timer recording settings may be rearranged to complete the recording of the program in that one of slave broadcast storage apparatus 12.

According to still another process of starting to record a program while the program is being broadcast, without setting timer recording therefor, if master broadcast storage apparatus 11 is aware of the broadcasting end time of the program which it is instructed to start recording without setting timer recording therefor, then master broadcast storage apparatus 11 regards the broadcasting end time as the recording end time of the program. Master broadcast storage apparatus 11 then selects slave broadcast storage apparatus 12 which is not presently recording any program and which has not been set for timer recording until the recording end time of a program to be recorded, and instructs selected slave broadcast storage apparatus 12 to start recording the program. Master broadcast storage apparatus 11 may recognize the broadcasting end time of the program which it is instructed to start recording by referring to the EPG which is stored therein, for example.

Therefore, if the user attempts to start recording a program without setting timer recording therefor, then the broadcast storage system is capable of immediately starting to record the program, and if the broadcasting end time of a program which the user has started recording is not known or known, any adverse effects on any timer recording settings that have already been made are minimized.

In the present embodiment, the user views the EPG on the display screen of television set 13 and selects a program to be set for timer recording. However, master broadcast storage apparatus 11 may automatically select a program to, be set for timer recording from the EPG. According to a conventional process of automatically selecting a program to be set for timer recording, master broadcast storage apparatus 11 may search the EPG based on a keyword that the user has determined in advance to select a program from the EPG, or may estimate the user's preference based on timer recording settings made in the past and a playback history and select a program that meets the estimated user's preference.

In the present embodiment, master broadcast storage apparatus 11 selects a broadcast storage apparatus to be set for timer recording by grasping timer recording statuses and available storage area capacities of broadcast storage system 10 in its entirety. However, since the broadcast storage apparatus individually grasp their respective timer recording statuses, master broadcast storage apparatus 11 may successively ask slave broadcast storage apparatus 12 about whether they can be set for timer recording or not until any one of slave broadcast storage apparatus 12 can accept a request for timer recording. If a response indicative of the acceptance of a request for timer recording is not returned from any one of slave broadcast storage apparatus 12, then master broadcast storage apparatus 11 replaces programs set for timer recording with each other between the broadcast storage apparatus, either based on the user's demand or automatically, and reevaluates the programs set for timer recording, thereby to obtain a storage area available for recording a new program in either one of the broadcast storage apparatus.

The timer recording statuses may be grasped and broadcast storage apparatus to be set for timer recording may be selected by personal computer 14.

Personal computer 14 may have a storage area for storing video and audio data and may be incorporated in broadcast storage system 10, and master broadcast storage apparatus 11 or personal computer 14 may select an apparatus for storing video and audio data from the available broadcast storage apparatus or areas.

The present embodiment is concerned with broadcast storage system 10 which comprises master broadcast storage apparatus 11 and slave broadcast storage apparatus 12 each capable of recording a program in one channel. However, the present invention is also applicable to a broadcast storage system which comprises a master broadcast storage apparatus and slave broadcast storage apparatus each capable of recording a single transport stream. Specifically, since each broadcast storage apparatus is incapable of recording data in one time zone of a plurality of transport streams that are different from each other, the broadcast storage system is arranged for the master broadcast storage apparatus and the slave broadcast storage apparatus, each capable of recording a single transport stream, to record data of a plurality of transport streams.

The present invention is further applicable to any broadcast storage system comprising a plurality of apparatus each capable of recording data of a broadcasting unit that is selected by one tuner.

The process of assigning a plurality of programs to be recorded to broadcast storage apparatus, respectively, which is carried out by master broadcast storage apparatus 11, is applicable to not only an apparatus or a system for recording broadcast programs, but also an apparatus which does not record programs, but selects programs to be recorded and proposes an assignment of the selected programs to broadcast storage apparatus and a broadcast storage system. One example of such an apparatus comprises a computer for reading a program from a recording medium and executing the read program.

Examples of user interfaces that are used for recording programs in broadcast storage apparatus and playing back recorded programs will be described below.

FIG. 5 shows, by way of example, an EPG displayed on the display screen of television set 13 for setting programs for timer recording.

As shown in FIG. 5, the displayed EPG has a horizontal array of all channels that can be recorded and a vertical time axis, and shows information about programs, e.g., program titles, etc., at corresponding positions in time slots below the channels. If the number of broadcasting channels increases, then it is necessary to display programs broadcast on those many channels in the EPG. For example, if the number of broadcasting channels is 100, then programs broadcast on those 100 channels are displayed in the horizontal array in the EPG.

The program positions or time slots where programs have been set for timer recording either by the user or automatically are highlighted to distinguish from other program positions or time slots.

FIG. 6 shows, by way of example, a shortened EPG displayed on the display screen of television set 13 for playing back recorded programs.

As shown in FIG. 6, the displayed shortened EPG has a horizontal array of broadcast storage apparatus of broadcast storage system 10 and a vertical time axis, and shows information about recorded programs, e.g., channels and program titles, etc., at corresponding positions in time slots below the broadcast storage apparatus. It is assumed in FIG. 6 that broadcast storage system 10 comprises two broadcast storage apparatus. With the original EPG shown in FIG. 5, the program information cannot be displayed fully on the display screen and hence cannot easily be seen by the user if the number of channels in the horizontal array increases. In the shortened EPG shown in FIG. 6, the program information is easy to see because the apparatus for recording programs are displayed in the horizontal array.

If the timer recording statuses are grasped and broadcast storage apparatus to be set for timer recording are selected by personal computer 14, then the EPGs for setting programs for timer recording and playing back recorded programs may be displayed on the display screen of television set 13 by personal computer 14.

2nd Embodiment

Figure 7:
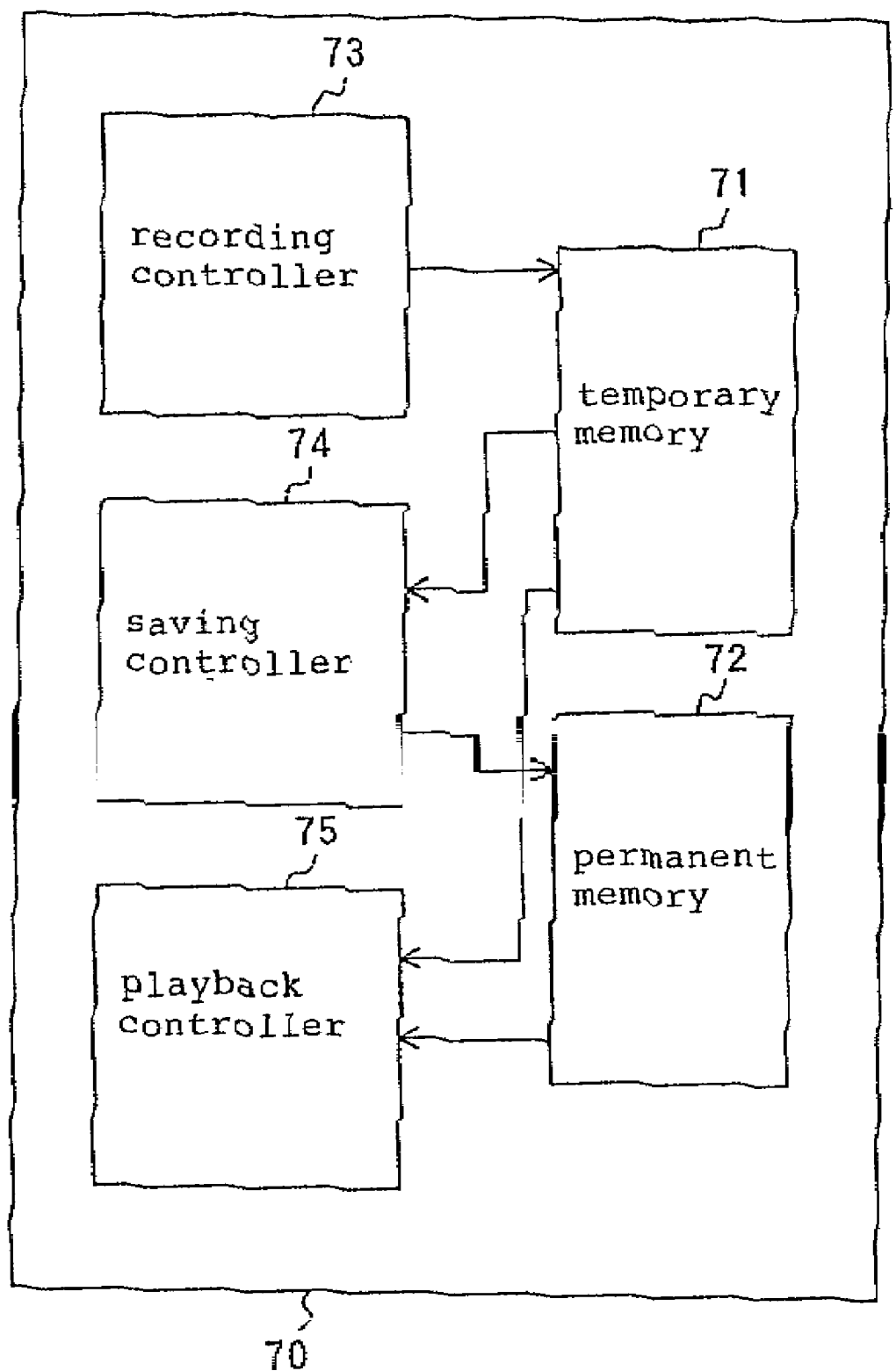
FIG. 7 is a block diagram of a broadcast storage apparatus according to a second embodiment of the present invention.

Referring to FIG. 7, broadcast storage apparatus 70 according to a second embodiment of the present invention can be used as master broadcast storage apparatus 11 shown in FIG. 1. If broadcast storage apparatus 70 is used as slave broadcast storage apparatus 12, then it should operate according to instructions from master broadcast storage apparatus 11.

As shown in FIG. 7, master broadcast storage apparatus 70 comprises temporary memory 71, permanent memory 72, recording controller 73, saving controller 74, and playback controller 75.

Temporary memory 71 comprises an FIFO memory or a ring buffer for temporarily storing the video and audio data of recorded programs. Permanent memory 72 stores those video and audio data stored in temporary memory 71 which the user has selected as data to be permanently stored. Temporary memory 71 and permanent memory 72 may be present as being physically or logically separated in a memory medium such as a hard disk or the like. Recording controller 73 records new programs one after another in temporary memory 71. For example, recording controller 73 automatically records broadcasts on given channels continuously for a predetermined period of time or a predetermined number of days. If video and audio data are recorded to the full capacity of temporary memory 71, then recorded programs are erased from temporary memory 71 successively from the oldest program when a new program is to be recorded. Saving controller 74 transfers the video and audio data of a program that the user has selected as data to be permanently stored from the video and audio data of the programs stored in temporary memory 71, to permanent memory 72. Playback controller 75 plays back a program selected by the user from among the programs that are stored in temporary memory 71 or permanent memory 72.

Operation of broadcast storage apparatus 70 will be described below.

Recording controller 73 records programs broadcast on given channels one after another in temporary memory 71. Temporary memory 71 thus stores the video and audio data of the programs broadcast on the given channels continuously for a predetermined period of time or a predetermined number of days. Then, saving controller 74 transfers the video and audio data of a program that the user has selected as data to be permanently stored from temporary memory 71 to permanent memory 72. When instructed by the user to play back a program, playback controller 75 reads the video and audio data of the program selected by the user from among the programs that are stored in temporary memory 71 or permanent memory 72, and plays back the program.

According to the present embodiment, therefore, since the user is capable of actually viewing some or all of the programs that have automatically been stored in temporary memory 71 at a desired time and selecting programs to be saved, the user can choose only those programs that the user really wants to save.

Broadcast storage apparatus 70 usually operates to store the video and audio data of recorded programs directly in permanent memory 72, and may start recording a program in temporary memory 71 as selected by the user. When the user selects a mode of using temporary memory 71, temporary memory 71 starts continuously recording programs on a given channel.

Broadcast storage apparatus 70 may display information indicative of a time up to which a program stored in temporary memory 71 is held without being erased, on the display screen of television set 13. With the displayed information, the user is able to know a time up to which it is necessary to determine whether the program is to be saved or not.

Broadcast storage apparatus 70 may allow the user to set memory areas for storing video and audio data to temporary memory 71 and permanent memory 72. According to such an option, the user can determine a period of time for which programs are stored in temporary memory 71 so as to match the user's own pace, and hence can determine whether a program is to be automatically recorded and saved or not at the user's own pace.

3rd Embodiment

Figure 8:
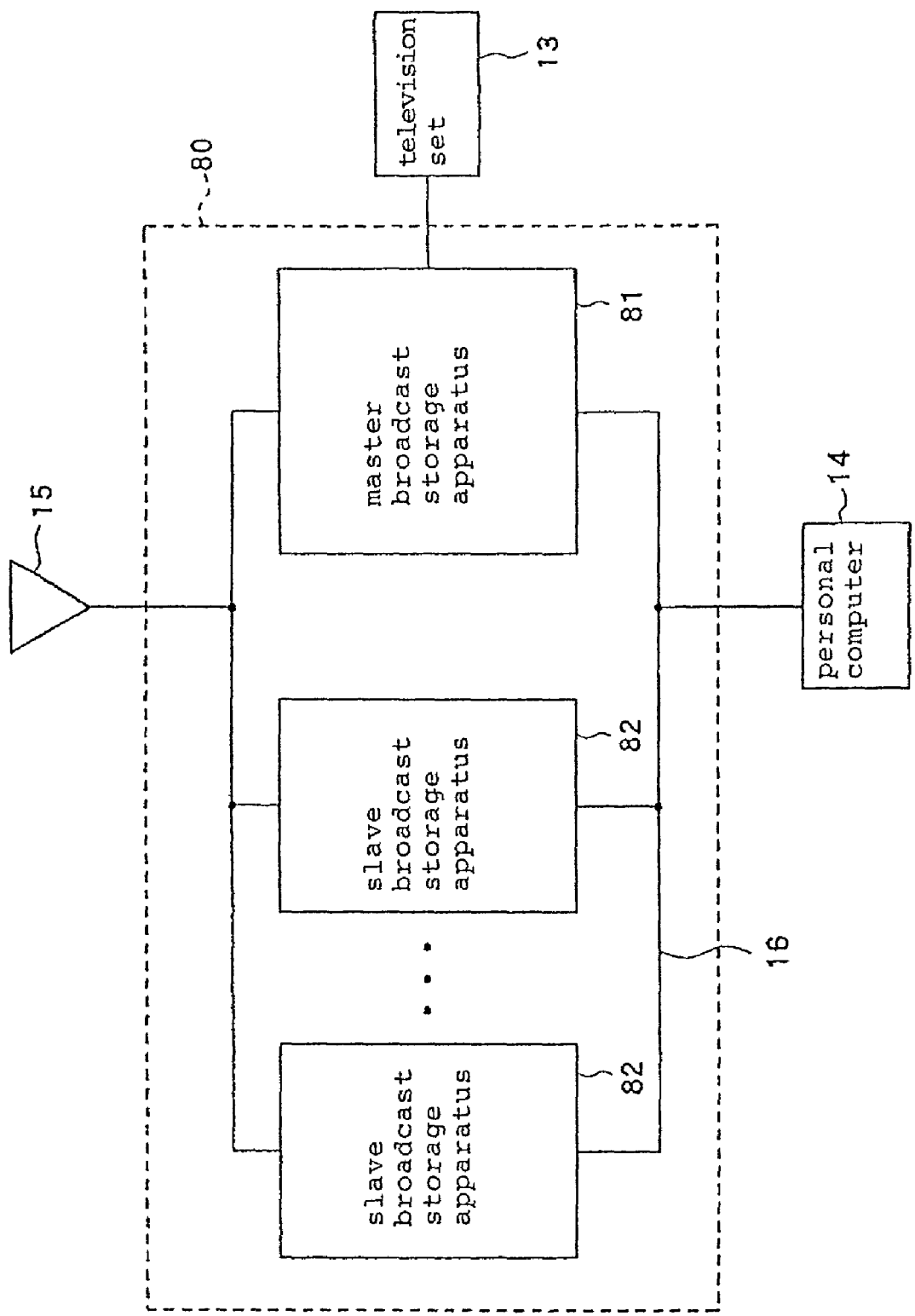
FIG. 8 is a block diagram of a broadcast storage system according to a third embodiment of the present invention.

Referring to FIG. 8, broadcast storage system 80 according to a third embodiment of the present invention comprises master broadcast storage apparatus 81 and a plurality of slave broadcast storage apparatus 82. Master broadcast storage apparatus 81 and slave broadcast storage apparatus 82 are connected to antenna 15 and also to each other by communication lines 16 to which personal computer 14 is connected. Master broadcast storage apparatus 81 is connected to television set 13.

Master broadcast storage apparatus 81 and slave broadcast storage apparatus 82 are permanently assigned to respective given channels for continuously recording programs that are broadcast on the respective channels. While broadcast storage system 80 is preferably arranged so as to be able to record all available channels, it may also be arranged so as to be able to record some of the available channels.

Operation of broadcast storage system 80 will be described below.

First, a recording mode of broadcast storage system 80 will be described below.

In broadcast storage system 80, master broadcast storage apparatus 81 and slave broadcast storage apparatus 82 automatically continuously record programs broadcast on the respective channels. Master broadcast storage apparatus 81 and slave broadcast storage apparatus 82 store the video and audio data of programs for a predetermined period of time or a predetermined number of days (hereinafter referred to as "retention period").

A playback mode of broadcast storage system 80 will be described below.

Broadcast storage system 80 plays back a program at a desired time in the retention period. The desired time can be selected by the user, and can be set forward or back by the user using a dial or a scroll bar. While a program in a certain channel is being played back, if the user operates a dial or a cursor key to change the channel to another channel, then broadcast storage system 80 plays back a program broadcast on the other channel at the same time as the program which is presently played back. That is, the user can freely change channels as if viewing programs on a real-time basis at a time in the past.

According to the present embodiment, therefore, the user can view programs in the past in the same manner as if viewing them on a real-time basis. Since the user can set forward and back the viewing time, the operability of the broadcast storage system for viewing programs is increased.

As with the embodiment shown in FIG. 7, each of master broadcast storage apparatus 81 and slave broadcast storage apparatus 82 of broadcast storage system 80 may have a temporary memory and a permanent memory. With such a temporary memory and a permanent memory, broadcast storage system 80 is capable of moving (saving) a program in a retention period whose video and audio data are stored in the temporary memory to the permanent memory. The user can thus choose modes of use of broadcast storage system 80 depending on the purpose for which the user uses broadcast storage system 80.

4th Embodiment

Figure 9:
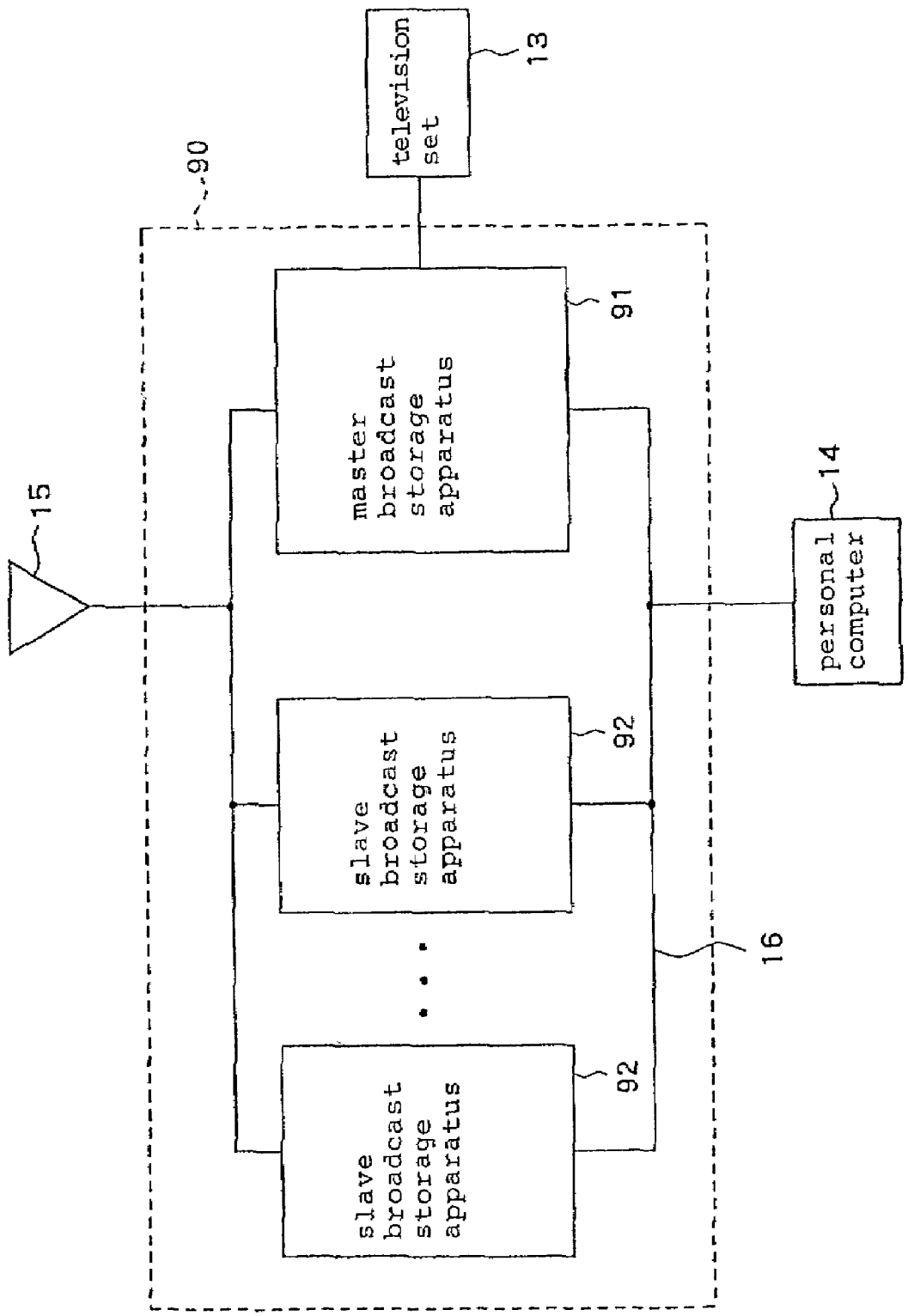
FIG. 9 is a block diagram of a broadcast storage system according to a fourth embodiment of the present invention.

Referring to FIG. 9, broadcast storage system 90 according to a fourth embodiment of the present invention comprises master broadcast storage apparatus 91 and a plurality of slave broadcast storage apparatus 92. Master broadcast storage apparatus 91 and slave broadcast storage apparatus 92 are connected to antenna 15 and also to each other by communication lines 16 to which personal computer 14 is connected. Master broadcast storage apparatus 91 is connected to television set 13.

Figure 10:
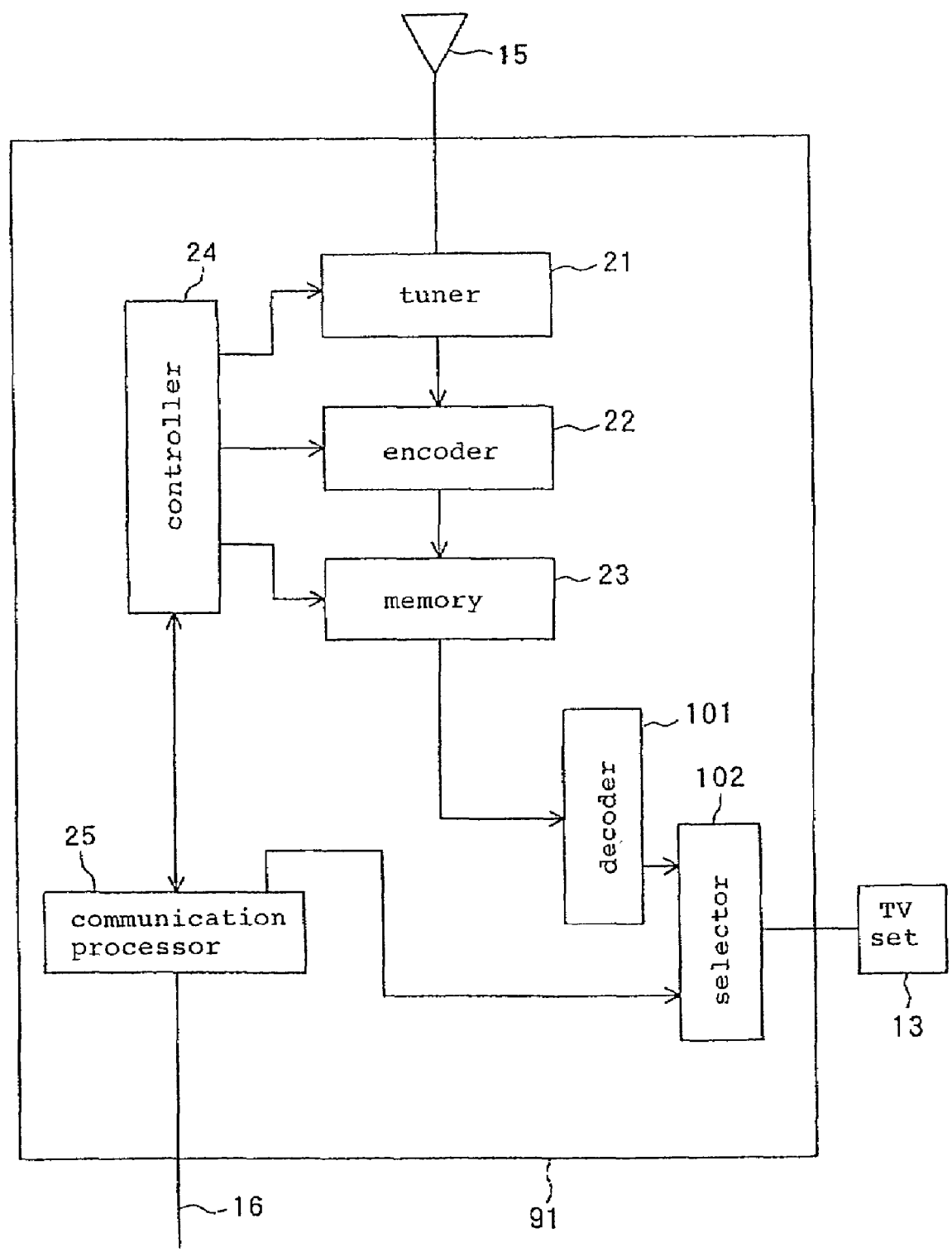
FIG. 10 is a block diagram of a master broadcast storage apparatus in the broadcast storage system shown in FIG. 9.

As shown in FIG. 10, master broadcast storage apparatus 91 comprises tuner 21, encoder 22, memory 23, controller 24, communication processor 25, decoder 101, and selector 102.

Tuner 21, encoder 22, memory 23, controller 24, and communication processor 25 are identical to those shown in FIG. 2. Decoder 101 decodes video and audio data read from memory 23. Selector 102 selects either the video and audio data decoded by decoder 101 or the video and audio data received by communication processor 25, and supplies the selected video and audio data to television set 13.

Figure 11:
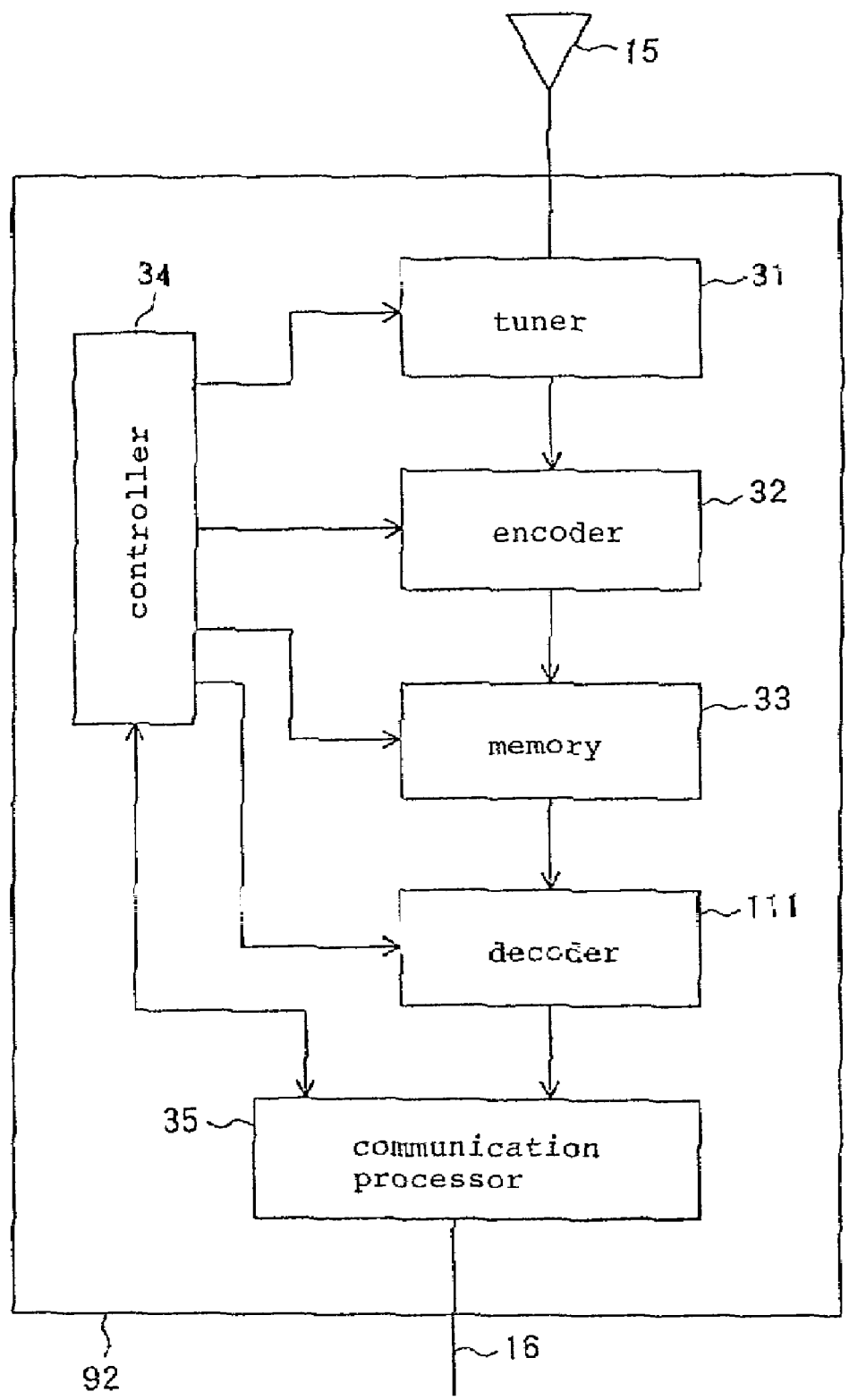
FIG. 11 is a block diagram of a slave broadcast storage apparatus in the broadcast storage system shown in FIG. 9.

As shown in FIG. 11, each of slave broadcast storage apparatus 92 comprises tuner 31, encoder 32, memory 33, controller 34, communication processor 35, and decoder 111.

Tuner 31, encoder 32, memory 33, controller 34, and communication processor 35 are identical to those shown in FIG. 3. Decoder 111 decodes video and audio data read from memory 23. Therefore, video and audio signals transmitted and received over the communication lines 16 are decoded signals.

A recording mode of broadcast storage system 90 is the same as the recording mode of broadcast storage system 10 shown in FIG. 1.

A playback mode of broadcast storage system 90 will be described below.

For playing back a program recorded in either one of the broadcast storage apparatus, the use specifies the program to be played back by seeing the recorded program information displayed on the display screen of television set 13. Master broadcast storage apparatus 91 determines which one of the broadcast storage apparatus has been storing the specified program. If the program has been stored in master broadcast storage apparatus 91, then master broadcast storage apparatus 91 reads the video and audio data of the program from the memory 23, and decoder 101 decodes the video and audio data and inputs the decoded video and audio data to television set 13. If the program has been stored in either one of slave broadcast storage apparatus 92, then master broadcast storage apparatus 91 instructs one of slave broadcast storage apparatus 92 to play back the program.

When slave broadcast storage apparatus 92 is instructed to play back the program, slave broadcast storage apparatus 92 reads the video and audio data of the program from the memory 33, and decoder 111 decodes the read video and audio data and transmits the decoded video and audio data as video and audio signals of the program to master broadcast storage apparatus 91.

Master broadcast storage apparatus 91 outputs the received video and audio data to television set 13. Master broadcast storage apparatus 91 estimates a program which is highly likely to be played back by a control action of the user, separately from the program which is being played back. Master broadcast storage apparatus 91 can estimate a program which is highly likely to be played back, from the position that is pointed by the cursor in a playback selection view displayed on television set 13. Master broadcast storage apparatus 91 may estimate not only one program but also a plurality of programs.

If an estimated program is stored in an apparatus other than the apparatus which is currently playing back a program, then master broadcast storage apparatus 91 instructs the apparatus to prepare itself for playing back the program. In the instructed apparatus, the decoder prepares the program for playback.

When the user instructs the apparatus to play back the prepared program, broadcast storage system 90 immediately starts playing back the program.

According to the present embodiment, therefore, since the time required to switch between programs to be played back is shortened, broadcast storage system 90 can be used by the user with greater ease.

The embodiment shown in FIG. 8 may be combined with the embodiment shown in FIG. 9 for increasing the operability of broadcast storage system 80 shown in FIG. 8.

While preferred embodiments of the present invention have been described using specific terms, such description is for illustrative purposes only, and it is to be understood that changes and variations may be made without departing from the spirit or scope of the invention.

What is claimed is:

1. A system for recording and storing a program broadcast in at least one channel, said system comprising:
   one or more slave apparatus for setting a program for timer recording when said slave apparatus is instructed to set the program for timer recording, and recording the program at a time when the program set for timer recording is broadcast; and a master apparatus for selecting a slave apparatus to record a program such that a plurality of timer recording settings are not made at one time in one apparatus, when the program to be recorded is determined, and instructing the selected slave apparatus to set the program for timer recording, wherein said master apparatus has means for, if a slave apparatus to record a program cannot be selected, rearranging timer recording settings made in the slave apparatus to retain a slave apparatus to record a program, instructing the retained slave apparatus to change timer recording settings and set the program for timer recording, and instructing other slave apparatus in which timer recording settings are changed to change timer recording settings, and wherein each of said slave apparatus has means for, if instructed to change timer recording settings by said master apparatus, changing timer recording settings.

2. A system according to claim 1, wherein said master apparatus has means for, if instructed to start recording a program without setting timer recording therefor, instructing a slave apparatus which has not recorded programs so far and whose period of time up to the recording start time of a first program set for timer recording is the longest, to start recording the program, and wherein each of said slave apparatus has means for, if instructed to start recording a program, immediately starting to record said program.

3. A system according to claim 1, wherein said master apparatus has means for, if instructed to start recording a program without setting timer recording therefor, selecting a slave apparatus which has not recorded programs so far and which has not made timer recording settings until the end time of a program instructed to start being recorded, and instructing the selected slave apparatus to start recording the program, and wherein each of said slave apparatus has means for, if instructed to start recording a program, immediately starting to record said program.

4. A system according to claim 1, wherein said master apparatus and each of said slave apparatus are connected to each other via a communication line, each of said slave apparatus has means for indicating a program set for timer recording by the slave apparatus to said master apparatus via said communication line, and said master apparatus has means for instructing the slave apparatus to set the program for timer recording via said communication line.

5. A system according to claim 4, wherein each of said slave apparatus has means for transmitting a playback signal produced by playing back a program via said communication line to said master apparatus, and said master apparatus has means for outputting the program to an output device for displaying the program when the master apparatus has received the playback signal via said communication line.

6. A system according to claim 1, wherein said master apparatus comprises a computer.

7. A system according to claim 1, wherein said slave apparatus comprise respective add-on modules which can be incorporated in said master apparatus.

8. A system according to claim 1, wherein said slave apparatus comprise a desired number of software modules that can be executed by said master apparatus.

9. A system for recording and storing a program broadcast in at least one channel, said system comprising:
one or more slave apparatus for setting a program for timer recording when said slave apparatus is instructed to set the program for timer recording, and recording the program at a time when the program set for timer recording is broadcast; and
a master apparatus for selecting a slave apparatus to record a program such that a plurality of timer recording settings are not made at one time in one apparatus, when the program to be recorded is determined, and instructing the selected slave apparatus to set the program for timer recording,
wherein said master apparatus has means for, if instructed to start recording a program without setting timer recording therefor, rearranging timer recording settings made in the slave apparatus, increasing, as much as possible, a period of time up to the recording start time of a first program set for timer recording in either one of the slave apparatus, instructing the slave apparatus in which timer recording settings are changed to change timer recording settings, and instructing the slave apparatus whose period of time up to the recording start time has been increased as much as possible to start recording the program, and wherein each of said slave apparatus has means for, if instructed to change timer recording settings by said master apparatus, changing timer recording settings, and, if instructed to start recording a program, immediately starting to record said program.

10. A system for recording and storing a program broadcast in at least one channel, said system comprising:
one or more slave apparatus for determining whether the slave apparatus are capable of recording a program or not in response to an inquiry as to whether the slave apparatus are capable of recording the program, and, if the slave apparatus are capable of recording the program, sending a corresponding response, setting the program for timer recording, and recording the program when a time to broadcast the program is reached; and
a master apparatus for, if a program to be recorded is determined, successively asking the slave apparatus about whether the slave apparatus are capable of recording the program until the response indicating that the slave apparatus are capable of recording the program is received, and, if said response is received from a slave apparatus, instructing the slave apparatus which has sent the response to set the program for timer recording, wherein said master apparatus has means for, if said response indicating that the slave apparatus are capable of recording the program is not received from any of the slave apparatus, rearranging timer recording settings made in the slave apparatus to retain a slave apparatus to record the program.

11. A system according to claim 10, wherein said master apparatus and each of said slave apparatus are connected to each other via a communication line, and said master apparatus has means for asking the slave apparatus about whether the slave apparatus are capable of recording the program.

12. A system according to claim 11, wherein each of said slave apparatus has means for transmitting a playback signal produced by playing back a program via said communication line to said master apparatus, and said master apparatus has means for outputting the program to an output device for displaying programs when the master apparatus has received the playback signal via said communication line.

13. A system according to claim 12, wherein said master apparatus has means for displaying, on said output device, a list of programs stored in said slave apparatus in association with the slave apparatus and times at which the programs have been recorded, for the user to select a program to be played back from the list.

14. A system according to claim 12, wherein said master apparatus has a function to record and play back said program.

15. A system according to claim 10, wherein said master apparatus comprises a computer.

16. A system according to claim 10, wherein said slave apparatus comprise respective add-on modules which can be incorporated in said master apparatus.

17. A system according to claim 10, wherein said slave apparatus comprise a desired number of software modules that can be executed by said master apparatus.

18. A system for recording and storing a program broadcast on at least one channel, said system comprising:
- a master apparatus; and
- one or more slave apparatus;
- said master apparatus comprising:
- a first tuner for extracting a signal on an indicated channel from a received broadcast signal;
- a first encoder for encoding the signal on said channel to generate program data;
- a first memory for storing said program data;
- a selector for selecting one of said program data read from said first memory and program data input from another device;
- a decoder for decoding said program data input from said selector; and
- a controller for grasping programs set for timer recording in each of all the apparatus, and, if a program to be recorded is determined, selecting an apparatus to record the program such that a plurality of timer recording settings are not made at one time in one apparatus, and, if the master apparatus is selected, extracting a channel on which the program is broadcast with said first tuner when a time to broadcast the program is reached, generating program data of the program with said first encoder, and storing the program data in said first memory, and, if a slave apparatus other than the master apparatus is selected, instructing the selected slave apparatus to set the program for timer recording, and, if the program data of a program instructed by the user to be played back is stored in said first memory of the master apparatus, reading the program data from said first memory, and decoding the program data with said first decoder, and, if the program data of a program instructed by the user to be played back is stored in a slave apparatus other than the master apparatus, instructing said slave apparatus to play back the program, and decoding the program data input from said slave apparatus with said first decoder;
- each of said slave apparatus comprising:
- a second tuner for extracting a signal on an indicated channel from a received broadcast signal;
- a second encoder for encoding the signal on said channel to generate program data;
- a second memory for storing said program data; and
- a controller for extracting a channel on which a program set for timer recording is broadcast with said second tuner when a time to broadcast the program is reached, generating program data of the program with said second encoder, storing the program data in said second memory, reading the program data of a program instructed by said master apparatus to be played back from said second memory, and transmitting the read program data to said master apparatus, wherein said controller in said master apparatus has means for, if an apparatus to records a program cannot be selected, rearranging timer recording settings made in the apparatus to retain an apparatus to record a program, instructing the retained apparatus to change timer recording to settings and set the program for timer recording, and instructing other apparatus in which timer recording settings are changed to change timer recording settings.

19. A system according to claim 18, wherein said slave apparatus comprise respective add-on modules which can be incorporated in said master apparatus.

20. A system according to claim 18, wherein said slave apparatus comprise a desired number of software modules that can be executed by said master apparatus.

21. An apparatus in a system for recording and storing a program broadcast on at least one channel, said apparatus comprising:
- a tuner for extracting a signal on an indicated channel from a received broadcast signal;
- an encoder for encoding the signal on said channel to generate program data;
- a memory for storing said program data;
- a decoder for decoding said program data read from said memory; and
- a controller for grasping programs set for timer recording in a plurality of apparatus including said apparatus itself, and, if a program to be recorded is determined, selecting an apparatus to record the program such that a plurality of timer recording settings are not made at one time in one apparatus, and, if said apparatus itself is selected, extracting a channel on which the program is broadcast with said tuner when a time to broadcast the program is reached, generating program data of the program with said encoder, and storing the program data in said memory, and, if an apparatus other than said apparatus itself is selected, instructing the selected apparatus to set the program for timer recording, and, if the program data of a program instructed by the user to be played back is stored in said memory of the apparatus itself, reading the program data from said memory, and decoding the program data with said decoder, and, if the program data of a program instructed by the user to be played back is stored in an apparatus other than the apparatus itself, instructing said other apparatus to play back the program, and decoding the program data input from the other apparatus with said decoder, wherein said controller has means for, if an apparatus to record a program cannot be selected, rearranging timer recording settings made in the apparatus to retain an apparatus to record a program, instructing the retained apparatus to change timer recording settings and set the program for timer recording, and instructing other apparatus in which timer recording settings are changed to change timer recording settings.

22. An apparatus according to claim 21, wherein said controller has means for, if instructed to start recording a program without setting timer recording therefor, instructing an apparatus which has not recorded programs so far and whose period of time up to the recording start time of a first program set for timer recording is the longest, to start recording the program.

23. An apparatus according to claim 21, wherein said controller has means for, if instructed to start recording a program without setting timer recording therefor, selecting an apparatus which has not recorded programs so far and which has not made timer recording settings until the end time of a program instructed to start being recorded, and instructing the selected apparatus to start recording the program.

24. An apparatus in a system for recording and storing a program broadcast on at least one channel, said apparatus comprising:
- a tuner for extracting a signal on an indicated channel from a received broadcast signal;

an encoder for encoding the signal on said channel to generate program data;

a memory for storing said program data;

a decoder for decoding said program data read from said memory; and a controller for grasping programs set for timer recording in a plurality of apparatus including said apparatus itself, and, if a program to be recorded is determined, selecting an apparatus to record the program such that a plurality of timer recording settings are not made at one time in one apparatus, and, if said apparatus itself is selected, extracting a channel on which the program is broadcast with said tuner when a time to broadcast the program is reached, generating program data of the program with said encoder, and storing the program data in said memory, and, if an apparatus other than said apparatus itself is selected, instructing the selected apparatus to set the program for timer recording, and, if the program data of a program instructed by the user to be played back is stored in said memory of the apparatus itself, reading the program data from said memory, and decoding the program data with said decoder, and, if the program data of a program instructed by the user to be played back is stored in an apparatus other than the apparatus itself, instructing said other apparatus to play back the program, and decoding the program data input from the other apparatus with said decoder, wherein said controller has means for, if instructed to start recording a program without setting timer recording therefor, rearranging timer recording settings made in the apparatus, increasing, as much as possible, a period of time up to the recording start time of a first program set for timer recording in either one of the apparatus, instructing the apparatus in which timer recording settings are changed to change timer recording settings, and instructing the apparatus whose period of time up to the recording start time has been increased as much as possible to start recording the program.

25. A system for recording a program broadcast on at least one channel, storing program data of the program, and playing back the program when instructed by the user, said system comprising:

one or more slave apparatus for automatically continuously recording a program on a predetermined channel and playing back the recorded program as instructed; and a master apparatus for, when the user is to determine a channel on which each of the slave apparatus automatically continuously records a program and to select a program to be played back on the channel, displaying a list of programs recorded by all the slave apparatus in association with channels and times at which the programs are recorded, on an output device for displaying programs, and, if a program to be displayed is selected by the user with a channel and a time, controlling the slave apparatus which has recorded the program to play back the program, and, if the user changes the channel to another channel, controls the slave apparatus which has recorded a program on the other channel at the same time as the former channel to play back the program on the other channel, wherein said master apparatus has means for, if a slave apparatus to record a program cannot be selected, rearranging timer recording settings made in the slave apparatus to retain a slave apparatus to record a program, instructing the retained slave apparatus to change timer recording settings and set the program for timer recording, and instructing other slave apparatus in which timer recording settings are changed to change timer recording settings, and wherein each of said slave apparatus has means for, if instructed to change timer recording settings by said master apparatus, changing timer recording settings.

26. A system according to claim 25, wherein said slave apparatus comprise respective add-on modules which can be incorporated in said master apparatus.

27. A system according to claim 25, wherein said slave apparatus comprise a desired number of software modules that can be executed by said master apparatus.

28. A system for recording and storing a program broadcast on at least one channel, said system comprising:

a master apparatus; and one or more slave apparatus;

said master apparatus comprising:

a first memory for storing the program data of recorded programs;

a first decoder for decoding program data read from said first memory; and a controller for grasping programs recorded by each of all the apparatus, and, if the program data of a program instructed by the user to be played back is stored in the first memory of the master apparatus, reading the program data from said first memory, decoding the program data into a program signal with said first decoder, outputting the program signal to an output device for displaying programs, and, if the program data of a program instructed by the user to be played back is stored in a slave apparatus, instructing the slave apparatus to play back the program, outputting a program signal received from the slave apparatus to said output device, and, if the program data of a program which is highly likely to be played back by a subsequent control action of the user is stored in the first memory of the master apparatus, preparing the master apparatus to read the program data from said first memory and decode the program data with said first decoder, and, if the program data of a program which is highly likely to be played back by a subsequent control action of the user is stored in a slave apparatus, instructing the slave apparatus to prepare said slave apparatus to play back the program; and each of said slave apparatus comprising:

a second memory for storing said program data;

a second decoder for decoding the program data read from said second memory into a program signal; and a controller for reading the program data of a program instructed by said master apparatus to be played back from said second memory, decoding the program data into a program signal with said second decoder, transmitting the program signal to said master apparatus, reading the program data of the program instructed to be prepared for playback from said second memory, and preparing said second decoder to decode the program data, wherein said master apparatus has means for, if a slave apparatus to record a program cannot be selected, rearranging timer recording settings made in the slave apparatus to retain a slave apparatus to record a program, instructing the retained slave apparatus to change timer recording settings and set the program for timer recording, and instructing other slave apparatus in which timer recording settings are changed to change timer recording settings, and wherein each of said slave apparatus has means for, if instructed to change timer recording settings by said master apparatus, changing timer recording settings.

29. A system according to claim 28, wherein said slave apparatus comprise respective add-on modules which can be incorporated in said master apparatus.

30. A system according to claim 28, wherein said slave apparatus comprise a desired number of software modules that can be executed by said master apparatus.

31. An apparatus in a system for recording and storing a program broadcast on at least one channel, said apparatus comprising:
- a memory for storing the program data of recorded programs;
- a decoder for decoding program data read from said memory; and
- a controller for grasping programs recorded by each of all apparatus of the system, and, if the program data of a program instructed by the user to be played back is stored in the memory of the apparatus itself, reading the program data from said memory, decoding the program data into a program signal with said decoder, outputting the program signal to an output device for displaying programs, and, if the program data of a program instructed by the user to be played back is stored in an apparatus other than said apparatus itself, instructing the other apparatus to play back the program, outputting a program signal received from the other apparatus to said output device, and, if the program data of a program which is highly likely to be played back by a subsequent control action of the user is stored in the memory of said apparatus itself, preparing the apparatus itself to read the program data from said memory and decode the program data with said decoder, and, if the program data of a program which is highly likely to be played back by a subsequent control action of the user is stored in an apparatus other than the apparatus itself, instructing the other apparatus to prepare said other apparatus to play back the programs,
- wherein said master apparatus has means for, if a slave apparatus to record a program cannot be selected, rearranging timer recording settings made in the slave apparatus to retain a slave apparatus to record a program, instructing the retained slave apparatus to change timer recording settings and set the program for timer recording, and instructing other slave apparatus in which timer recording settings are changed to change timer recording settings, and wherein each of said slave apparatus has means for, if instructed to change timer recording settings by said master apparatus, changing timer recording settings.

32. An apparatus for controlling a plurality of broadcast recording apparatus each for, if instructed to set a program for timer recording, setting the program for timer recording, and recording the program when a time to broadcast the program set for timer recording is reached, said apparatus comprising:
- means for selecting one of the broadcast recording apparatus to record the program such that a plurality of timer recording settings are not made at one time in one apparatus;
- means for instructing the selected broadcast recording apparatus to set the program for timer recording; and
- means for, if an apparatus to record a program cannot be selected, rearranging timer recording settings made in the apparatus to retain an apparatus to record a program, instructing the retained apparatus to change timer recording settings and set the program for timer recording, and instructing other apparatus in which timer recording settings are changed to change timer recording settings.

33. A system for recording and storing a plurality of units of data from data broadcast in units selected by a single tuner, said system comprising:
- one or more slave apparatus for, if instructed to set a unit of data for timer recording, setting the data for timer recording, and recording the data when a time to broadcast the data is reached; and
- a master apparatus for grasping data set for timer recording by said slave apparatus, and, if data to be recorded is determined, selecting one of the slave apparatus such that a plurality of timer recording settings are not made at one time in one apparatus, and instructing the selected slave apparatus to set the data for timer recording, wherein if an apparatus to record a program cannot be selected, said master apparatus is adapted to rearrange timer recording settings made in the apparatus to retain an apparatus to record a program and to instruct the retained apparatus to change timer recording settings and set the program for timer recording, and instruct other apparatus in which timer recording settings are changed to change timer recording settings.

34. A system according to claim 33, wherein each of said units comprises a transport stream.

35. A computer readable storage medium having computer readable program for operating on a computer in communication with an apparatus in a system for recording and storing a program in at least one system, the apparatus having a tuner for extracting a signal in an indicated channel from a received broadcast signal, an encoder for encoding the signal on said channel to generate program data, a memory for storing said program data, and a decoder for decoding said program data stored in said memory, said computer program comprising instructions that cause the computer to perform the steps of:
- grasping programs set for timer recording in a plurality of apparatus including said apparatus itself, and, if a program to be recorded is determined, selecting an apparatus to record the program such that a plurality of timer recording settings are not made at one time in one apparatus:
- if said apparatus itself is selected, instructing said tuner to extract a channel on which the program is broadcast when a time to broadcast the program is reached;
- instructing said encoder to generate program data of the program, and instructing said memory to store the program data;
- if an apparatus other than said apparatus itself is selected, instructing the selected apparatus to set the program for timer recording;
- if the program data of a program instructed by the user to be played back is stored in said memory of the apparatus itself, instructing said memory to read the program data, and instructing said decoder to decode the program data;
- if the program data of a program instructed by the user to be played back is stored in an apparatus other than the apparatus itself, instructing said other apparatus to play back the program, and instructing said decoder to decode the program data input from the other apparatus;
- if an apparatus to record a program cannot be selected,
- rearranging timer recording settings made in the apparatus to retain an apparatus to record a program; and instructing the retained apparatus to change timer recording settings and set the program for timer recording, and instructing other apparatus in which timer recording settings are changed to change timer recording settings.

36. A computer readable storage medium having computer readable program for operating on a computer in communication with an apparatus in a system for recording and storing a program broadcast on at least one channel, said apparatus having a memory for storing program data of a recorded program and a decoder for decoding program data read from said memory, said computer program comprising instructions that cause the computer to perform the steps of:

grasping programs set for timer recording in all apparatus of the system, and, if the program data of a program instructed by the user to be played back is stored in the memory of the apparatus itself, reading the program data from said memory, instructing said decoder to decode the program data into a program signal, and outputting the program signal to an output device for displaying programs;

if the program data of a program instructed by the user to be played back is stored in an apparatus other than said apparatus itself, instructing the other apparatus to play back the program, and outputting a program signal received from the other apparatus to said output device;

if the program data of a program which is highly likely to be played back by a subsequent control action of the user is stored in the memory of said apparatus itself, preparing the apparatus itself to read the program data from said memory and decode the program data with said decoder; and if the program data of a program which is highly likely to be played back by a subsequent control action of the user is stored in an apparatus other than the apparatus itself, instructing the other apparatus to prepare said other apparatus to play back the program, wherein said master apparatus has means for, if a slave apparatus to record a program cannot be selected, rearranging timer recording settings made in the slave apparatus to retain a slave apparatus to record a program, instructing the retained slave apparatus to change timer recording settings and set the program for timer recording, and instructing other slave apparatus in which timer recording settings are changed to change timer recording settings, and wherein each of said slave apparatus has means for, if instructed to chance timer recording settings by said master apparatus, changing timer recording settings.

37. A computer readable storage medium having computer readable program for operating on a computer for controlling a plurality of apparatus each for, if instructed to set a program for timer recording, setting the program for timer recording, and recording the program when a time to broadcast the program set for timer recording is reached, said computer program comprising instructions that cause the computer to perform the steps of:

selecting one of the apparatus to record the program such that a plurality of timer recording settings are not made at one time in one apparatus; and assigning the selected apparatus to setting the program for timer recording, if an apparatus to record a program cannot be selected, rearranging timer recording settings made in the apparatus to retain an apparatus to record a program; and instructing the retained apparatus to change timer recording settings and set the program for timer recording, and instructing other apparatus in which timer recording settings are changed to change timer recording settings.

* * * * *